(12) United States Patent
Hirai

(10) Patent No.: US 8,257,846 B2
(45) Date of Patent: Sep. 4, 2012

(54) TEMPERATURE INCREASING METHOD FOR SODIUM-SULFUR BATTERY

(75) Inventor: Naoki Hirai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/177,937

(22) Filed: Jul. 7, 2011

(65) Prior Publication Data

US 2011/0262781 A1  Oct. 27, 2011

Related U.S. Application Data

(63) Continuation of application No. PCT/JP2010/050111, filed on Jan. 7, 2010.

(30) Foreign Application Priority Data

Jan. 13, 2009  (JP) .................................. 2009-004608

(51) Int. Cl.
*H01M 10/44* (2006.01)
(52) U.S. Cl. ......................................................... 429/52
(58) Field of Classification Search .................. None
See application file for complete search history.

(56) References Cited

FOREIGN PATENT DOCUMENTS

| JP | 47-031130 A1 | 11/1972 |
|---|---|---|
| JP | 49-012328 A1 | 2/1974 |
| JP | 49-111129 A1 | 10/1974 |
| JP | 54-068927 A1 | 6/1979 |
| JP | 08-017474 A1 | 1/1996 |
| JP | 09-219216 A1 | 8/1997 |
| JP | 2001-176542 A1 | 6/2001 |
| JP | 2001-210362 A1 | 8/2001 |
| JP | 2004-111123 A1 | 4/2004 |

OTHER PUBLICATIONS

Sadahiro Ikeuchi, et al., "*Bunsangata Dengen Setsubi no Doko to Sho-Energy Taisaku*," Sogo setsubi Konsarutanto/Gijutsu Nenpo, 2003, vol. 28, pp. 12 to 16.

*Primary Examiner* — Barbara Gilliam
*Assistant Examiner* — Stephan Essex
(74) *Attorney, Agent, or Firm* — Burr & Brown

(57) ABSTRACT

A temperature increasing method for a sodium-sulfur battery includes three or more temperature gradients, and inflection points of 90±5° C. and 150±5° C. at which the temperature gradient changes, and the temperature gradient in a section from 90±5° C. to 150±5° C. is 5° C./h or less, whereby it is possible to increase a temperature of the sodium-sulfur battery quickly without affecting the quality of the sodium-sulfur battery.

7 Claims, 1 Drawing Sheet

TEMPERATURE INCREASING METHOD FOR SODIUM-SULFUR BATTERY

FIELD OF THE INVENTION

The present invention relates to a temperature increasing method at the start-up of a sodium-sulfur battery for use applications such as leveling of a power load, a countermeasure for instantly lowering a power, and compensation for a fluctuation of a renewal energy power generation device.

BACKGROUND OF THE INVENTION

A sodium-sulfur battery is a secondary battery obtained by isolating molten metal sodium which is a cathode active substance from molten sulfur which is an anode active substance by a beta alumina solid electrolyte having selective permeability with respect to sodium ions. During discharging, molten sodium releases electrons that become sodium ions, and these ions pass through a solid electrolyte tube to move to an anode side, and react with the electrons passed through sulfur and an external circuit to generate sodium polysulfide, thereby generating a voltage of about 2 V (with an electric cell). During charging, in reverse to the discharging, a generating reaction of sodium and sulfur occurs. In an operation cycle of the sodium-sulfur battery for a use application such as leveling of a load, such a cycle including the discharging and charging repeats with intermissions.

Such a sodium-sulfur battery usually has a constitution in which a plurality of electric cells are connected in series, to form a string, a plurality of strings are connected in parallel, to form a block, a plurality of blocks are connected in series, to form a module, and a plurality of modules are further connected in series.

Moreover, for the purpose of causing a reaction of $xS+2Na^+ +2e^- \leftrightarrow Na_2S_x$ as described above, the sodium-sulfur battery is operated while keeping a temperature (substantially, the temperature around the module) above a melting point of sodium polysulfide, for example, in a range from about 280° C. to 350° C. (approximately 300° C.). Therefore, at the start-up of the sodium-sulfur battery for shipping, it is first necessary to increase a temperature of the battery by heaters disposed around the modules. Heretofore, at the start-up of the sodium-sulfur battery, the temperature has been increased from ordinary temperature to approximately 300° C. with a predetermined temperature gradient.

It is to be noted that examples of a prior-art document include JP-A-2004-111123.

SUMMARY OF THE INVENTION

However, such a conventional temperature increasing method for a sodium-sulfur battery requires an excessive amount of time, and cannot match a construction work requirement to be shortened efficiently.

On the other hand, when the sodium-sulfur battery is started up in such a hurry that a temperature is increased at a stroke from ordinary temperature to approximately 300° C. with a steep temperature gradient, it is not possible to deny a danger that the quality of the sodium-sulfur battery is affected.

The present invention has been developed in view of such a situation, and an object thereof is to provide a temperature increasing method for a sodium-sulfur battery which is performed as quickly as possible but which might not affect the quality of the sodium-sulfur battery. As a result of conducted investigations, it has been found that when the temperature is increased with a number of stages of temperature gradients, the above object can be achieved. Specifically, according to the present invention, means are provided as follows.

That is, first, according to the present invention, there is provided a temperature increasing (rising) method for a sodium-sulfur battery including: three or more temperature gradients (or temperature increasing rates) when increasing a temperature of the battery from ordinary temperature to a temperature above a melting point of sodium polysulfide (or more); and at least inflection points of 90±5° C. and 150±5° C. at which the temperature gradient changes, wherein the temperature gradient in a section from 90±5° C. to 150±5° C. is 5° C./h or less.

The three or more temperature gradients mean that there are three or more different temperature gradients or three or more types of temperature gradients. The temperature gradient is represented by ° C/h, and corresponds to the temperature increasing rate as described in parentheses. 90±5° C. and 150±5° C. which define the inflection points in the section from 90±5° C. to 150±5° C. are more preferably 90±3° C. and 150±3° C., respectively, and especially preferably about 90° C. and about 150° C., respectively.

The temperature gradient in the section from 90±5° C. to 150±5° C. may be 5° C./h or less, can more specifically be set to a range from 0.1° C./h to 5° C./h, and the temperature gradient is more preferably set as follows.

In the temperature increasing method for the sodium-sulfur battery according to the present invention, the temperature gradient in the section from 90±5° C. to 150±5° C. is preferably 2° C./h or more and 4° C./h or less.

In the temperature increasing method for the sodium-sulfur battery according to the present invention, the temperature gradient in a section excluding the section from 90±5° C. to 150±5° C. preferably exceeds 5° C./h.

The temperature gradient in the section excluding the section from 90±5° C. to 150±5° C., especially in a section of 90±5° C. or lower preferably exceeds 7° C./h and especially preferably exceeds 8° C./h. On the other hand, the temperature gradient in a section of 150±5° C. or higher is preferably from 5° C./h to 7° C./h and especially preferably from 5° C./h to 6° C./h.

In the temperature increasing method for the sodium-sulfur battery according to the present invention, the temperature gradient in the whole region (when the temperature is increased from the ordinary temperature to the temperature above the melting point of sodium polysulfide) is preferably less than 10° C./h.

The temperature gradient in the whole region is more preferably less than 9° C./h. In this case, specifically it can be considered that the temperature gradient in the section of 90±5° C. or lower especially preferably exceeds 8° C./h, the temperature gradient in the section from 90±5° C. to 150±5° C. is especially preferably 2° C./h or more and 4° C./h or less, and the temperature gradient in the section of 150±5° C. or higher is especially preferably from 5° C./h to 6° C./h.

In the temperature increasing method for the sodium-sulfur battery according to the present invention, a temperature corresponding to the temperature above the melting point of sodium polysulfide is preferably set to be from 250° C. or higher and 360° C. or lower. This is because the temperature range becomes an operation range of the sodium-sulfur battery.

It is to be noted that the ordinary temperature indicates the temperature of the sodium-sulfur battery before the start-up thereof, which is to be generally equal to the temperature of the atmosphere (where the sodium-sulfur battery is disposed).

The temperature increasing method for the sodium-sulfur battery according to the present invention includes three or more temperature gradients when increasing the temperature of the battery from the ordinary temperature to the temperature above the melting point of sodium polysulfide, and at least the inflection points of 90±5° C. and 150±5° C. at which the temperature gradient changes, and the temperature gradient in the section from 90±5° C. to 150±5° C. is 5° C./h or less, whereby the sodium-sulfur battery can be started up in a shorter period of time without affecting the quality of the sodium-sulfur battery.

In a preferable aspect of the temperature increasing method for the sodium-sulfur battery according to the present invention, the temperature gradient in the section from 90±5° C. to 150±5° C. is 2° C./h or more and 4° C./h or less, whereby the above effect can more securely be obtained.

In another preferable aspect of the temperature increasing method for the sodium-sulfur battery according to the present invention, the temperature gradient in the section excluding the section from 90±5° C. to 150±5° C. exceeds 5° C./h, whereby the sodium-sulfur battery can be started up in a shorter period of time.

In still another preferable aspect of the temperature increasing method for the sodium-sulfur battery according to the present invention, the temperature gradient in the whole region is less than 10° C./h, whereby the sodium-sulfur battery can be started up without affecting the quality of the sodium-sulfur battery.

In a further preferable aspect of the temperature increasing method for the sodium-sulfur battery according to the present invention, the temperature corresponding to the temperature above the melting point of sodium polysulfide is 250° C. or higher and 360° C. or lower, whereby the sodium-sulfur battery can smoothly and securely be started up (initially operated), and any member is not thermally deteriorated.

DETAILED DESCRIPTION OF THE INVENTION

Figure 1:
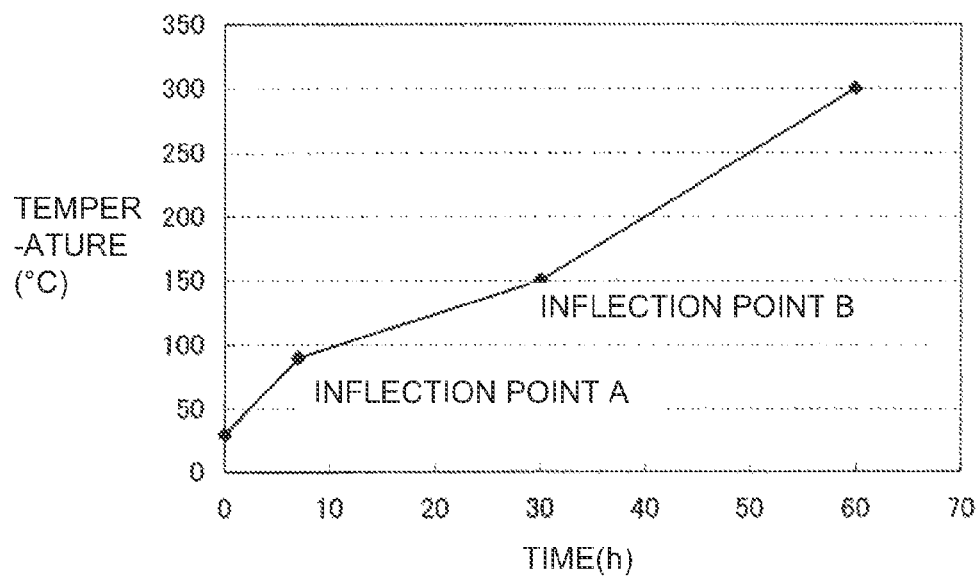
FIG. 1 is a graph showing an embodiment (a specific example) of a temperature increasing method for a sodium-sulfur battery according to the present invention.

Hereinafter, embodiments of the present invention will be described appropriately with reference to the drawings, but the present invention should not be limited to these embodiments when interpreted. Various alterations, modifications, improvements and replacements can be added on the basis of knowledge of a person skilled in the art without impairing the scope of the present invention. For example, the drawings show the preferable embodiments of the present invention, but the present invention is not restricted by aspects shown in the drawings or information shown in the drawings. When the present invention is implemented or verified, means similar or equivalent to means described in the present description can be applied, but preferable means are means described as follows.

Table 1 shows an embodiment (a specific example) of a temperature increasing method for a sodium-sulfur battery according to the present invention, and temperature increasing by heaters and time required for the temperature increasing are listed. FIG. 1 is a graph of the table, the abscissa indicates the time required for the temperature increasing, and the ordinate indicates the temperature.

TABLE 1

|  | Time (h) | | | |
| --- | --- | --- | --- | --- |
|  | 0 | 7 | 30 | 60 |
| Temp. (° C.) | 30 | 90 | 150 | 300 |

A temperature of the sodium-sulfur battery (the temperature increasing) is usually controlled by the heaters disposed on the side and bottom surfaces of each module in the sodium-sulfur battery, the temperature of the sodium-sulfur battery usually indicates the temperature of each module measured by a temperature measuring instrument (a sensor) disposed on the bottom surface of the module, and this also applies to the present description.

The present example included two inflection points A and B, and three temperature gradients. First, the temperature increasing was started from 30° C. (ordinary temperature), and the temperature was increased to 90° C. with a predetermined temperature gradient for seven hours. At this time, the temperature gradient is about 8.6° C./h. Up to 90° C., sodium and sulfur do not start to melt, and hence it is considered that even when the temperature gradient is enlarged, the quality of the sodium-sulfur battery is not easily affected. Here, time is gained, to achieve time shortening.

Next, at 90° C. (the inflection point A), the temperature gradient (a temperature increasing rate) was changed, and the temperature was increased to 150° C. with a predetermined temperature gradient (by a constant increasing rate) for 23 hours. At this time, the temperature gradient is about 2.6° C./h. In this section from 90° C. to 150° C., sodium and sulfur start to melt, so that when the temperature gradient is enlarged, the quality of the sodium-sulfur battery might be affected. Here, the temperature gradient is not to be enlarged in excess of 5° C./h.

It is considered that when the temperature gradient is enlarged in the section where sodium and sulfur start to melt, the quality of the sodium-sulfur battery is affected, and a reason for this consideration is as follows. That is, heat by the heaters is not simultaneously or uniformly transferred through the battery, and hence if the temperature gradient is large, a temperature distribution in the battery becomes non-uniform, thereby making a temperature difference among electric cells in the module. If the temperature difference is made, there a mix of electric cells where sodium and sulfur are molten and the electric cells where sodium and sulfur are not molten. In this state, a voltage difference is made among the electric cells, and electrons are forcibly transmitted and received. Such transmission/reception of the electrons in a low temperature state imposes large stress on the battery, which might cause the breakdown of the electric cells.

Next, at 150° C. (the inflection point B), the temperature gradient (the temperature increasing rate) was changed, and the temperature was increased to 300° C. with a predetermined temperature gradient for 30 hours, as shown in FIG. 1. At this time, the temperature gradient is about 5.0° C/h. Also in this section from 150° C. to 300° C., a generating reaction of $Na_2S_5$ starts to occur at the melting point of $Na_2S_5$ or a higher temperature as described later. Therefore, when the quality of the sodium-sulfur battery is taken into consideration, the temperature gradient does not have to be enlarged. On the other hand, the section occupies a half or more of the range of the temperature to be increased, and hence when the temperature gradient is small, start-up time of the sodium-sulfur battery lengthens. To solve the problem, at 150° C. or higher, the temperature gradient was set to 5° C/h.

Figure 2:
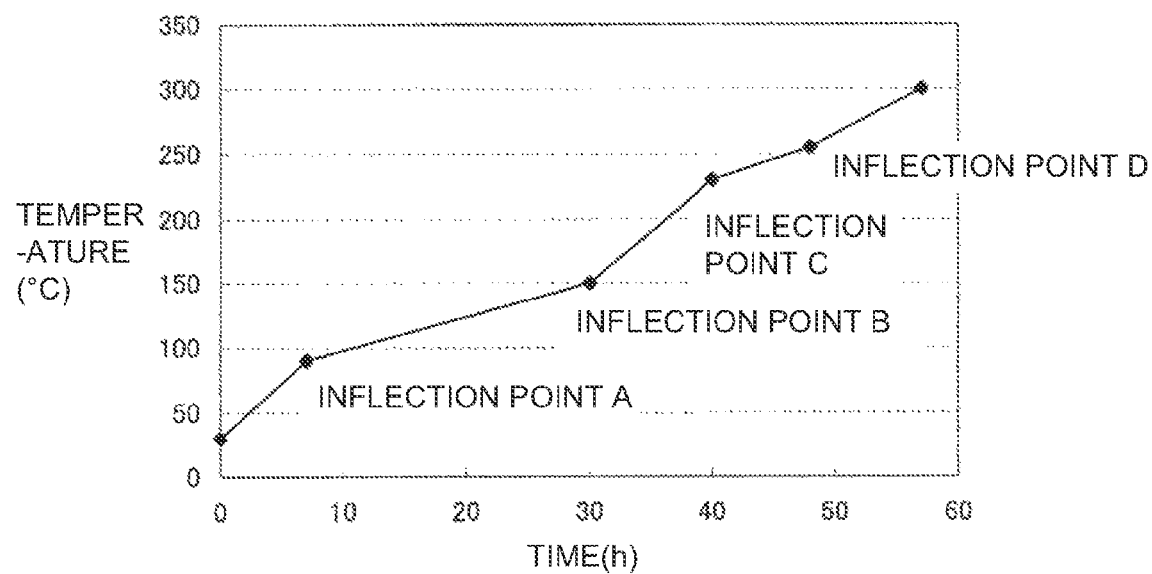
FIG. 2 is a graph showing another embodiment (a specific example) of the temperature increasing method for the sodium-sulfur battery according to the present invention.

Table 2 shows another embodiment (a specific example) of the temperature increasing method for the sodium-sulfur battery according to the present invention, and temperature increasing by heaters and time required for the temperature increasing are listed. FIG. 2 is a graph of the table, the abscissa indicates the time required for the temperature increasing, and the ordinate indicates the temperature.

TABLE 2

|  | Time (h) | | | | | |
| --- | --- | --- | --- | --- | --- | --- |
|  | 0 | 7 | 30 | 40 | 48 | 57 |
| Temp. (° C.) | 30 | 90 | 150 | 230 | 255 | 300 |

The present example included four inflection points A, B, C and D, and five temperature gradients. Up to 150° C., the present example is the same as the above-mentioned example (see Table 1 and FIG. 1). That is, first, the temperature increasing was started from 30° C. (ordinary temperature), and the temperature was increased to 90° C. with a predetermined temperature gradient for seven hours. At this time, the temperature gradient is 8.6° C./h. Up to 90° C., sodium and sulfur do not start to melt, and hence it is considered that even when the temperature gradient is enlarged, the quality of the sodium-sulfur battery is not easily affected. Here, time is gained, to achieve time shortening.

Next, at 90° C. (the inflection point A), the temperature gradient (a temperature increasing rate) was changed, and the temperature was increased to 150° C. with a predetermined temperature gradient for 23 hours. At this time, the temperature gradient is about 2.6° C./h. In this section from 90° C. to 150° C., sodium and sulfur start to melt, so that when the temperature gradient is enlarged, the quality of the sodium-sulfur battery might be affected. Here, the temperature gradient is not to be enlarged in excess of 5° C./h.

Next, at 150° C. (the inflection point B), the temperature gradient (the temperature increasing rate) was changed, and the temperature was increased to 230° C. with a predetermined temperature gradient for ten hours. At this time, the temperature gradient is about 8.0° C./h. In this section from 150° C. to 230° C., sodium and sulfur are already molten before sodium polysulfide starts to melt, and hence it is considered that even when the temperature gradient is enlarged, the quality of the sodium-sulfur battery is not easily affected. Here, time is gained, to achieve time shortening.

Then, at 230° C. (the inflection point C), the temperature gradient (the temperature increasing rate) was changed, and the temperature was increased to 255° C. with a predetermined temperature gradient for eight hours. At this time, the temperature gradient is about 3.1° C./h. In this section from 230° C. to 255° C., at a temperature exceeding the melting point (about 242° C.) of di-sodium penta-sulfide ($Na_2S_5$), the generating reaction of $Na_2S_5$ starts to occur. Therefore, when the temperature gradient is enlarged, the quality of the sodium-sulfur battery might be affected. Consequently, the temperature gradient preferably does not exceed 5° C./h.

It is considered that when the temperature gradient is enlarged in the section where $Na_2S_5$ starts to melt, the quality of the sodium-sulfur battery is affected, and a reason for this consideration is similar to the reason in the section where sodium and sulfur start to melt as follows. That is, heat by heaters is not simultaneously or uniformly transferred through the battery, and hence if the temperature gradient is large, a temperature distribution in the battery becomes non-uniform, thereby making a temperature difference among electric cells in each module. If the temperature difference is made, there are a mix of the electric cells where the generation of $Na_2S_5$ proceeds and the electric cells where the generation does not proceed. In this state, a voltage difference is made among the electric cells, and electrons are forcibly transmitted and received. Such transmission/reception of the electrons in a low temperature state imposes large stress on the battery, which might cause the breakdown of the electric cells.

Next, at 255° C. (the inflection point D), the temperature gradient (the temperature increasing rate) was changed, and the temperature was increased to 300° C. with a predetermined temperature gradient for nine hours. At this time, the temperature gradient is about 5.0° C./h. Also in this section from 255° C. to 300° C., the generating reaction of $Na_2S_5$ proceeds. Therefore, when the quality of the sodium-sulfur battery is taken into consideration, the temperature gradient does not have to be enlarged, but the quality is less affected as compared with another section. In consequence, for the purpose of shortening the start-up time of the sodium-sulfur battery, at 255° C. or higher, the temperature gradient was set to 5.0° C./h.

INDUSTRIAL APPLICABILITY

A temperature increasing method for a sodium-sulfur battery according to the present invention can preferably be utilized as temperature increasing means at the start-up of the sodium-sulfur battery for use applications such as leveling of a power load, a countermeasure for instantly lowering a power (instantly voltage reduction), and compensation for a fluctuation of a renewal energy power generation device.

The invention claimed is:

1. A temperature increasing method for a sodium-sulfur battery, the method comprising:
   increasing a temperature of the sodium-sulfur battery over three of more temperature gradients from room temperature to a temperature above a melting point of sodium polysulfide,
   wherein the temperature gradients change at least at inflection points of 90±5° C. and 150±5° C.; and
   the temperature increases at a rate of 5° C./h or less in a section from 90±5° C. to 150±5° C.

2. The temperature increasing method for the sodium-sulfur battery according to claim 1, wherein the temperature gradient in the section from 90±5° C. to 150±5° C. is 2° C./h or more and 4° C./h or less.

3. The temperature increasing method for the sodium-sulfur battery according to claim 1, wherein the temperature gradient in a section excluding the section from 90±5° C. to 150±5° C. exceeds 5° C./h.

4. The temperature increasing method for the sodium-sulfur battery according to claim 2, wherein the temperature gradient in a section excluding the section from 90±5° C. to 150±5° C. exceeds 5° C./h.

5. The temperature increasing method for the sodium-sulfur battery according to claim 1, wherein the temperature gradient from room temperature to the temperature above the melting point of sodium polysulfide is less than 10° C./h.

6. The temperature increasing method for the sodium-sulfur battery according to claim 2, wherein the temperature gradient from room temperature to the temperature above the melting point of sodium polysulfide is less than 10° C./h.

7. The temperature increasing method for the sodium-sulfur battery according to claim 3, wherein the temperature gradient from room temperature to the temperature above the melting point of sodium polysulfide is less than 10° C./h.

* * * * *